May 24, 1960 S. W. LANGE 2,937,877

TONE ARM WITH STRAIGHT LINE MOTION

Filed April 22, 1954

STANLEY W. LANGE,
INVENTOR,

BY Henry J. Stauffer

HIS ATTORNEY 2,937,877
Patented May 24, 1960

2,937,877

TONE ARM WITH STRAIGHT LINE MOTION

Stanley W. Lange, 11713 Hatcher Place, Silver Spring, Md.

Filed Apr. 22, 1954, Ser. No. 425,055

2 Claims. (Cl. 274—23)

Figure 1:
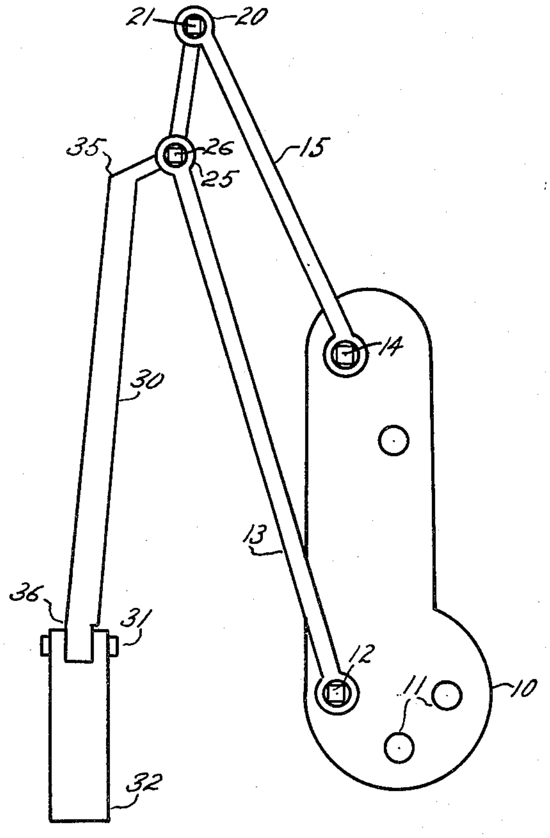

(Granted under Title 35, U.S. Code (1952), sec. 266)

This invention is in recording and reproducing apparatus, and particularly is in means for supporting the playback arm of a phonograph or the like.

As is well known, it is customary to form disc records (at least the master copies thereof) by driving a modulated cutting stylus along a radial line at controlled speed over the face of the disc as it rotates at the desired rate.

It is customary, on the other hand, to reproduce such records by means of a playback arm which is pivoted at one end adjacent the periphery of the record table and carries a needle at the other end which thus describes an arc (rather than a radius) as it travels through the groove. Such an arc may intersect a true radius only once; at best, it can intersect it at two points.

For home reproduction, and in some laboratory applications, the above-described arrangement is not objectionable, but in fact the playback is out of phase with the recorded signal except when the playback needle path coincides with the path followed by the cutting stylus. In any situation requiring great accuracy, therefore, it is desirable to support the playback arm (or the needle cartridge) in some fashion which will permit the needle to describe as nearly as possible a radius as the record is played. Various expedients have been proposed, and have been successful in varying degrees.

The present invention is directed to this problem, and the principal object thereof is to provide a novel support for the playback arm of a reproducing device which will permit the pick-up needle to describe a straight, radial line during playback.

A further object of the invention is to provide means of the general nature mentioned requiring straight-line motion of a playback needle without the necessity of adjusting the various parts.

Other objects will be apparent from a reading of the following specification and claims.

Figure 2:
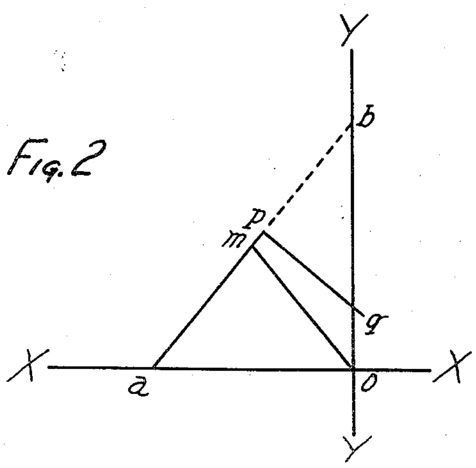

In the drawings:

Figure 1 is a plan view of one specific embodiment of the invention, and Figure 2 is a diagram illustrating the theory and operation of my invention.

Referring to the drawings and particularly to Figure 1, the pickup-arm assembly can be seen to comprise a base plate 10, having mounting holes, as 11, formed therein for fastening the plate to any suitable support by means of screws or bolts (not shown).

Secured in base plate 10, by means of bolt 12 is a pivot arm 13, and spaced therefrom (adjacent the other extremity of the base plate), and secured by a bolt 14, is pivoted a guide bar 15.

End 20 of guide bar 15 and end 25 of pivot arm 13 are secured to and support one end of the playback arm proper 30 by means of bolts 21 and 26, respectively, and at the other end of the playback arm is mounted (on bolt 31) a needle cartridge 32, containing a needle (not shown).

It should be noted at this point that playback arm 30, pivot arm 13, and guide bar 14, are formed of light, rigid material, as aluminum, and also that while they may for convenience be formed of separate elements, each functions as an integral member and thus that means must be provided for fastening the parts securely if the members are in fact not unitary.

Furthermore, it should perhaps be mentioned that the offset 35 in playback arm 30, and the further offset 36 (adjacent the cartridge support) are matters of design, and are not of significance to this invention.

It should additionally be understood that low-friction bearings, as ball bearings, are utilized at every point in the assembly at which friction may be a factor, namely, at pivots 12, 14, 21 and 26; and, while it does not enter into this invention, needle cartridge 32 likewise is best mounted in ball bearings.

Backlash, or play, in the parts of an assembly of this nature may produce important error in the reproduction of a signal. The bearings should therefore be carefully fitted so as to load the inner and outer races (assuming the use of ball bearings), and axial loads should be introduced at all points by means of careful adjustment of the several retainer bolts so that light metal-to-metal contact is obtained.

The playback arm of my invention depends upon the theory and operation of an elliptic trammel. Such a trammel, as is known, is composed essentially of a support carrying two intersecting slots or grooves, perpendicular to each other, and a stylus-carrying bar or beam fitted with two pins which move in the grooves. As the pins move through their successive positions in the two slots, the stylus describes an ellipse.

Referring now to Figure 2, there may be seen a horizontal axis X—X and a vertical axis Y—Y, intersecting at point O. Intersecting the two axes is a line *a—b*. If it be assumed that a pencil is located at point *m*, and that point *a* moves the length of the X axis while point *b* moves along the Y axis, the pencil will describe a circle about the point O. Should the pencil be located elsewhere along the line *a—b* the pencil will describe an ellipse and the eccentricity (or flatness) of the ellipse will increase as the chosen point is moved farther away from point *m*.

If point *p* is located near midpoint *m* the ellipse will approximate a circle and a small arc thereof will very closely approximate a true circular arc.

These are the circumstances upon which my invention is based. Figures 1 and 2 are similarly oriented so that relationships between the parts of the two figures will be apparent. Thus, pivot arm 13 corresponds to line O*m* and its upper end 25, of course, describes a circular arc about its pivot 12 (*o*, in Figure 2); the end 20 of guide bar 15 (corresponding to point *p* of line *p—q*) also describes a circular arc, and this is almost imperceptibly different from the theoretically correct elliptical arc it should trace. The X—X axis of Figure 2 should be understood to be a horizontal line (not shown) including pivot 12 and the stylus (not shown) carried by cartridge 32. The Y—Y axis should be understood to be a vertical line (not shown) including pivots 12 and 14. Playback arm 30, from its stylus to pivot 21 finds its Figure 2 counterpart in the line *a—p*.

The result is that the extremity of playback arm 30 and the needle carried thereby are required to travel an almost straight line. The amount of deviation, of course, will depend upon the locations of the various pivots, the lengths of the bars, etc. This is subject to mathematical analysis which is believed not to be necessary here. In this connection, however, attention is called to the fact that, in Figure 2, line *p—q* terminates beyond, that is, to the right of the Y—Y axis; and an inspection of Figure 1 will show that pivot 14 (analagous to *q*) also is displaced rightwardly (as well as upwardly) from pivot 12. It was discovered purely experimentally that, in some cases at least, a small displacement of this pivot from the axis produced better results than otherwise.

It may be mentioned, however, for an example, that in one embodiment of the invention, the distance from pivot to pivot along arm 13 was 10.0000 inches, the pivot-to-pivot length of guide bar 15 was 6.1667 inches, and the effective length of the playback arm was 12.0000 inches. The distance between the pivots 12 and 14 of pivot arm 13 and guide bar 15 was 5.8970 inches, and the spacing of their pivots in the playback arm 30 was 2.0000 inches.

Under these circumstances, the results were as follows: for 8 inches, the needle described a line not visibly distinguishable from a line drawn by a pencil and straight edge; nor was any phase change between original and recorded signals discernible on an oscilloscope. In an additional 2 inches of travel, the deviation of the needle was between .002 and .003 inches, not important in many applications. Beyond 10 inches, the line became definitely curved, and the device unusable (except when in fact accuracy of phase happened not to be important).

In the embodiment shown and above described, the parts moved freely and without play or backlash. A force of 5 grams was required at the needle to move the arm, and the vertical force on the stylus was 1.25 ounces; these figures of course are somewhat dependent upon factors not mentioned here.

It will be apparent that various expedients are available for mechanically producing an indefinitely long, theoretically straight, line of travel for a needle or the like. This invention, on the other hand, is a simple, troublefree, substitute for more elaborate and delicate devices, which, nevertheless, produces results not demonstrably different therefrom within the limits of its intended use.

The foregoing is in specific terms, and various modifications will suggest themselves. For the true scope of the invention, therefore, reference should be had to the appended claims.

I claim:

1. A mechanism for moving a stylus along a substantially straight line, which comprises a base, a tone arm, first and second arms for supporting and guiding the tone arm, means for connecting the arms pivotally to each other and to the base in accordance with the theory of an elliptic trammel in which each end point of a line lies at all times on one of two mutually perpendicular and intersecting axes and wherein the midpoint of the line describes a circular path around the intersection of the axes as the end points are moved along their associated axes and wherein a second point on the line describes an elliptical path around the intersection as the end points are so moved, the tone arm being designed to lie substantially along the line extending between the axes and being equal in length to the length of the line between one end point thereof and the point which describes the theoretical elliptical path, means for securing the stylus at the end of the tone arm that is located at the end point of the line which lies on one of the axes, the aforementioned connecting means comprising means connecting one end of the first arm pivotally to the tone arm at a point representing the midpoint of the line, means connecting the second end of the first arm pivotally to the base at a point representing the intersection of the axes, means connecting one end of the second arm pivotally to the end of the tone arm which describes the theoretical elliptical path, and means connecting the second end of the second arm pivotally to the base and at such a point thereon that the circular path which the first end of the second arm actually describes is imperceptibly different from the theoretical elliptical path it would describe were the second end of the second arm disconnected from the base.

2. A mechanism for moving a stylus along a substantially straight line, which comprises a base, a tone arm, first and second arms for supporting and guiding the tone arm, means for securing the stylus at one of the ends of the tone arm, means connecting one end of the first arm pivotally to the tone arm at a point near the second end of the tone arm, means connecting the second end of the first arm pivotally to the base and at a point which defines the intersection of two mutually perpendicular axes, the stylus lying on a first of the two axes and the distance between the stylus and the means connecting the tone arm and the first arm being such that an imaginary point lying substantially along the tone arm axis and at a similar distance on the opposite side of the means connecting the tone arm and the first arm also lies on the second of the two mutually perpendicular axes, and means including the second arm for maintaining the imaginary point on the second of the two mutually perpendicular axes, the last-mentioned means comprising means connecting one end of the second arm pivotally to the tone arm at the second end of the tone arm, and means connecting the second end of the second arm pivotally to the base and at such a point thereon that the circular arc which the first end of the second arm actually traverses is imperceptibly different from the theoretically correct elliptical arc it would traverse were the second end of the second arm disconnected from the base and the imaginary point traversed along the second of the mutually perpendicular axes.

References Cited in the file of this patent

UNITED STATES PATENTS 1,885,994 Dieux ---------------- Nov. 1, 1932

FOREIGN PATENTS 322,663 Great Britain ---------- Dec. 12, 1929